United States Patent [19]

Carre et al.

[11] 4,345,252

[45] Aug. 17, 1982

[54] NON-LINEAR DYNAMIC FILTERING DEVICE FOR THE ANGULAR MEASURING OF NOISE IN A RADAR

[75] Inventors: Roland Carre; Georges Doriath, both of Paris, France

[73] Assignee: Thomson-CSF, Paris, France

[21] Appl. No.: 119,397

[22] Filed: Feb. 7, 1980

[30] Foreign Application Priority Data

Feb. 13, 1979 [FR] France ............................. 79 03640

[51] Int. Cl.³ ............................................. G01S 13/44
[52] U.S. Cl. ................................. 343/5 NQ; 343/16 M
[58] Field of Search ......................... 343/16 M, 5 NQ

[56] References Cited

U.S. PATENT DOCUMENTS 4,064,510 12/1977 Chabah ...................... 343/16 M X
4,163,975 8/1979 Guilhem et al. ................ 343/16 M

FOREIGN PATENT DOCUMENTS 2828171 1/1979 Fed. Rep. of Germany ... 343/16 M

OTHER PUBLICATIONS

Article by Thomas Kronhamn entitled "An Application of Kalman Filtering to Target Tracking," IEEE International Conference on Radar, Oct. 23-25, 1973, pp. 360-365.
Article by Harold L. Jones and Thomas J. MacDonald entitled, "Comparisons of High Anti-Jam Design Techniques For GPS Receivers," IEEE National Aerospace and Electronics Conference, May 16-18, 1978, pp. 39-46.

Primary Examiner—Malcolm F. Hubler
Attorney, Agent, or Firm—Karl F. Ross

[57] ABSTRACT

To improve the accuracy of angular measurements in a radar or sonar system by suppressing noise due to target glint, an angular-deviation signal $\epsilon$ derived from the output signals $\Sigma$ and $\Delta$ of a sum channel and a difference channel is multiplied with a gain-control signal K(t) before being subjected to recursive filtering. Signal K(t) is obtained, also by recursive filtering, from a weighting function P(t) which goes to zero during periods when the measurement of the angular deviation is unreliable as determined from a low value of sum signal $\Sigma$ and from a peaking of a quadrature deviation signal $\epsilon q$, function P(t) being proportional to the product $\Sigma^n \cdot (S - |\epsilon q|)$ where the exponent n is at least equal to 1 and S is a predetermined threshold. The recursive filter processing the deviation signal $\epsilon$ has two cross-connected stages, both controlled by signal K(t), respectively emitting a corrected deviation measurement $\hat{\epsilon}$ and an estimated time differential $\tau d\hat{\epsilon}/dt$, $\tau$ being a delay introduced in a recursive loop of each stage. Prior to being multiplied with gain-control signal K(t), the deviation signal $\epsilon$ may be additively combined with an angular-orientation signal $\theta_r$ of a radar antenna to yield an angular value $\theta_c$ which can then be multiplied by a measured target distance D to provide a transverse-deviation signal d; in that case the two filter stages respectively emit a corrected deviation signal $\hat{d}$ and a target-velocity estimate $\hat{v}$.

10 Claims, 8 Drawing Figures

FIG_7

NON-LINEAR DYNAMIC FILTERING DEVICE FOR THE ANGULAR MEASURING OF NOISE IN A RADAR

FIELD OF THE INVENTION

Our present invention relates to a device for the nonlinear dynamic filtering of the measuring noise of the angular position of a target in a radar or sonar system.

BACKGROUND OF THE INVENTION

The processes for the measurement of the angular position of a target by a monopulse radar are based on the comparison of two or more different radiation diagrams pointed at the same target. There can be one or more measurements, e.g. one in elevation and one in azimuth.

The angular measurements are calculated on the basis of the amplitude of an electrical signal which is representative of the measurement. These measurements suffer from noise, particularly modulation noise resulting on the one hand from movements of the target relative to the radar and on the other hand from the geometry of the target. This noise limits the performances of radar systems and particularly of automatic tracking systems.

A radar system having means for measuring angular position or deviation has at least two radiation diagrams or patterns on reception. These diagrams are generated in at least two reception channels which respectively supply signal $\Sigma$ and a difference signal $\Delta$ (or two separate difference signals $\Delta S$ and $\Delta G$ if the measurements are performed in elevation and azimuth. The angular measurement generally utilizes the quotient $\epsilon$ of the signals $\Delta$ and $\Sigma$. The quotient $\epsilon$ is a measurement of the off-boresight angle of the detected target, i.e. of its offset from the axis of the two radiation diagrams. Filtering of the angular-measurement noise can be carried out by means of simple linear or nonlinear filters. Linear filtering has the disadvantage of leading to significant measuring delays in the case of deviation measurements. These delays then lead to dynamic errors in the measurement of the relative position of the detected target or targets. Nonlinear filtering has led to improvements which, however, have been found to be inadequate in certain cases. A nonlinear filtering device disclosed in commonly owned U.S. Pat. No. 4,220,953 (granted to one of us, Roland Carré) measures the deviation signal $\epsilon$ at instants of minimum error probability as determined from the magnitude of the sum signal $\Sigma$ and possibly of an ancillary deviation signal $\epsilon q$ in quadrature with signal $\epsilon$. However, the residual noise levels and the measuring delay are still by no means negligible. Thus, these filters have a reduced efficiency in automatic tracking systems when using rapidly maneuvered targets, whereby the target geometry can vary rapidly in view of the movement of the latter.

OBJECT OF THE INVENTION

The object of our present invention, therefore, is to provide an improved filtering device of this type eliminating the aforementioned drawbacks.

SUMMARY OF THE INVENTION

A circuit arrangement according to our invention, designed to improved the accuracy of angular measurements in an echo-type target-locating system (radar or sonar) with a first reception channel emitting the sum signal $\Sigma$, a second reception channel emitting the difference signal $\Delta$, and circuitry connected to these channels for deriving therefrom the angular-deviation and quadrature deviation signals $\epsilon$, $\epsilon q$ respectively appearing on a first and a second output thereof, comprises first and second calculating means in cascade with each other. The first calculating means is connected to the first reception channel and to the second output for generating a weighting function P(t) under the control of the sum signal $\Sigma$ and the quadrature deviation signal $\epsilon q$, the weighting function P(t) going to zero during periods in which signal $\Sigma$ is low and signal $\epsilon q$ is peaking, i.e. has an absolute value exceeding a predetermined threshold S. The second calculating means establishes a gain-control signal K(t) varying with function P(t). A dynamic filter connected to the second calculating means and to the first output of the aforementioned circuitry processes the signal $\epsilon$ by multiplying it with signal K(t) and subjecting the product to recursive filtering.

Pursuant to a more particular feature of our invention, this gain-control signal K(t) is fed to two multipliers included in respective recursive loops of two stages of the dynamic filter, one stage emitting a corrected deviation signal while the other stage emits an estimated time derivative of that corrected signal multiplied by a delay $\tau$ introduced in each of these loops. The multiplier of the latter stage may have an input connected to an output of the other multiplier whereby the signal processed in this stage is multiplied with the square of signal K(t).

An advantage of the present invention is the particularly low noise level of the angular-deviation measurement, which is below that of other noise sources. A further advantage is that an estimate of the measurement differential exists, making it possible to compensate all additional delays of the radar systems in an auxiliary external computer, in a manner not relevant to the present invention, whereby the true instantaneous position of the target is determined by a calculation of the first order.

BRIEF DESCRIPTION OF THE DRAWING

The above and other features of our invention will now be described in greater detail with reference to the attached drawing wherein.

DETAILED DESCRIPTION

A radar designed to carry out measurements giving the angular aiming error between the axis of its antenna and the direction of a target has two reception patterns. These two patterns are produced by an antenna, e.g. of the monopulse type, whose receiver thus has two reception channels respectively supplying the aforementioned sum and difference signals $\Sigma$ and $\Delta$. The two reception channels are connected to means for performing the angular measurements which are utilized in the remainder of the system. The case of a radar which provides only a single angular-deviation measurement will be taken as an example for the sake of simplicity. However, our invention is of course also applicable to radars which perform several angular measurements.

The calculation of the angular deviation makes use, as already noted, of the quotient of signals $\Delta$ and $\Sigma$. In order to obtain the sign of the angular aiming error, the measuring means operate according to the following equation:

$$\epsilon = \frac{|\Delta|}{|\Sigma|} \cos(\Phi_\Sigma - \Phi_\Delta) \quad (1)$$

where $\epsilon$ is the measurement of the angular deviation in magnitude and sign, $|\Delta|$ is the modulus (absolute magnitude) of the difference signal, $|\Sigma|$ is the modulus of the sum signal, and $\Phi_\Sigma$ and $\Phi_\Delta$ are the respective phases of the sum signal $\Sigma$ and the difference signal $\Delta$.

Figure 1:
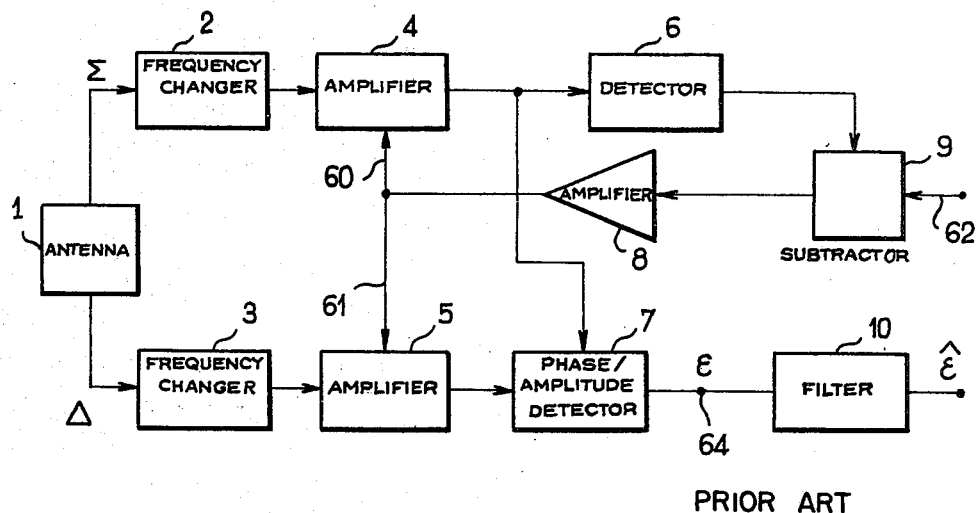
FIG. 1 is a block diagram of a conventional angular-deviation-measurement device in a radar system, using a linear filter.

This operation can be carried out in various known ways and a typical circuit arrangement for this purpose is shown in FIG. 1.

In FIG. 1 an antenna 1, e.g. of the monopulse type, suplies signals $\Sigma$, $\Delta$ representative of two radiation patterns to a sum channel and a difference channel. Frequency changers 2 and 3 transmit these signals $\Sigma$ and $\Delta$ to two variable-gain amplifiers 4 and 5 having gain-control inputs 60 and 61, respectively. The gains of the amplifiers are controlled by an automatic-gain-control (AGC) loop on the basis of the sum signal $\Sigma$. This loop, extending from the output of amplifier 4 to the control input 60 thereof, comprises in succession a detector circuit 6, a subtractor 9 receiving a reference signal from a terminal 62, and a loop amplifier 8. The angular-deviation or error signal $\hat{\epsilon}$ is obtained from the output of a phase/amplitude detector 7, supplied by amplifiers 4 and 5, and is available at a terminal 64. In a conventional filtering operation, a linear filter 10 is connected to terminal 64 and supplies the filtered error signal $\epsilon$; this however, results in significant residual noise and the aforementioned delay which falsifies the determination of the position of the moving target at the time of measurement.

Figure 2:
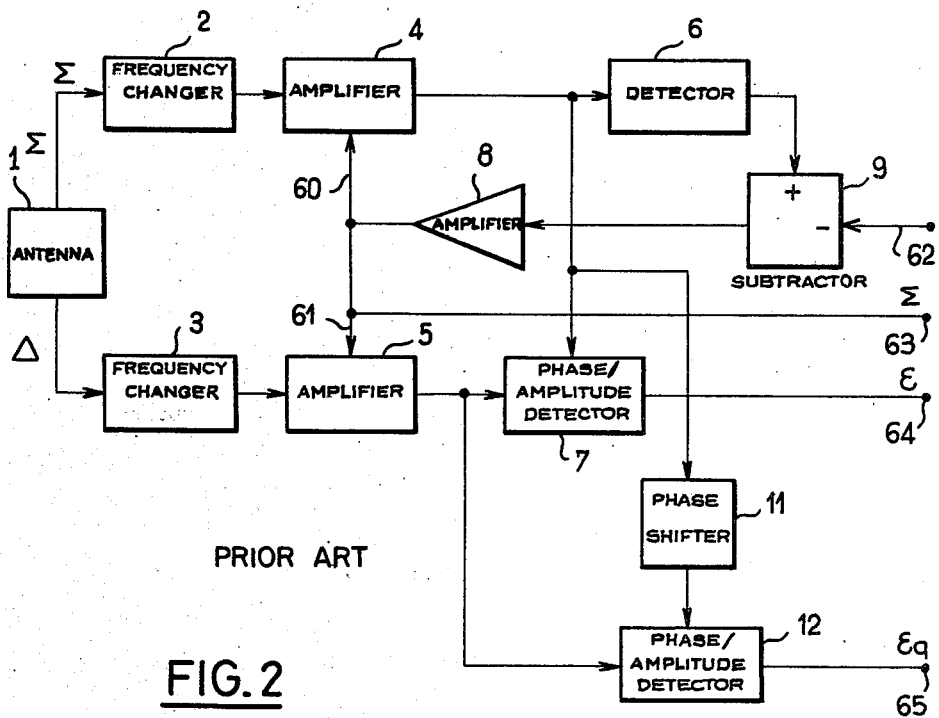
FIG. 2 is a similar block diagram of a known radar system having means for supplying signals $\Sigma$, $\epsilon$ and $\epsilon q$.

To obviate these disadvantages, the system described in the commonly owned U.S. Pat. No. 4,220,953 uses a supplementary output channel supplying a signal $\epsilon q$ in quadrature with error signal $\epsilon$. A circuit arrangement for the generation of this signal $\epsilon q$ is shown in FIG. 2 which, in addition to the elements illustrated in FIG. 1, includes a 90° phase shifter 11 whose input is connected to the output of amplifier 4 and whose output is connected to a phase/amplitude detector 12 also receiving the output of amplifier 5. This phase/amplitude detector 12 supplies signal $\epsilon q$ to a terminal 65. Moreover, the sum signal $\Sigma$ is available at a terminal 63 connected to the output of the loop amplifier 8. The circuitry of FIG. 2 is identical with that shown in FIG. 1 of the prior patent.

The measurement performed would be exact if the target detected by the radar were a point. In actual fact, however, several points of the target reflect waves toward the radar. These points, located at different distances, produce echoes which overlap in the resolving circuits of the radar with relative phase shifts resulting from the differences in distance whereby errors arise in the reading of the angular-deviation signal $\epsilon$. These errors fluctuate because of the movements of the target; that phenomenon is called "glint."

A complex target such as an aircraft or missile, for example, can be likened to a few preponderant reflecting points on which are superimposed diffuse reflections of low level. A study of the amplitude fluctuations of the sum signal $\Sigma$ has revealed that the angular-measurement errors bear a close relationship with these fluctuations. Similarly, a study of the fluctuations of the quadrature-deviation signal $\epsilon q$ has shown that the measurement errors are also related to these fluctuations.

The signal $\epsilon q$ is obtained according to the following equation:

$$\epsilon q = \frac{|\Delta|}{|\epsilon|} \sin(\Phi_\Sigma - \Phi_\Delta) \quad (2)$$

and does not contain a measurement of the aiming error relative to the target. Its effective value is related to the angular distance spanned by the target.

The device according to our invention utilizes the correlation between the fluctuations of signals $\Sigma$ and $\epsilon q$ in order to deduce therefrom the weighting function $P(t)$ for the error signal $\epsilon$ serving to amplify the good measurements and to cancel out the others. The selection logic for signal $\epsilon$ is based on the following principles:

the measurements have a high probability of being significant when the amplitude of signal $\Sigma$ passes through a local maximum;

the measurements have a high probability of not being significant when the amplitude of signal $\Sigma$ passes through a local minimum;

the measurements are either very good or very bad in the vicinity of a zero crossing of signal $\epsilon q$.

Figure 3:
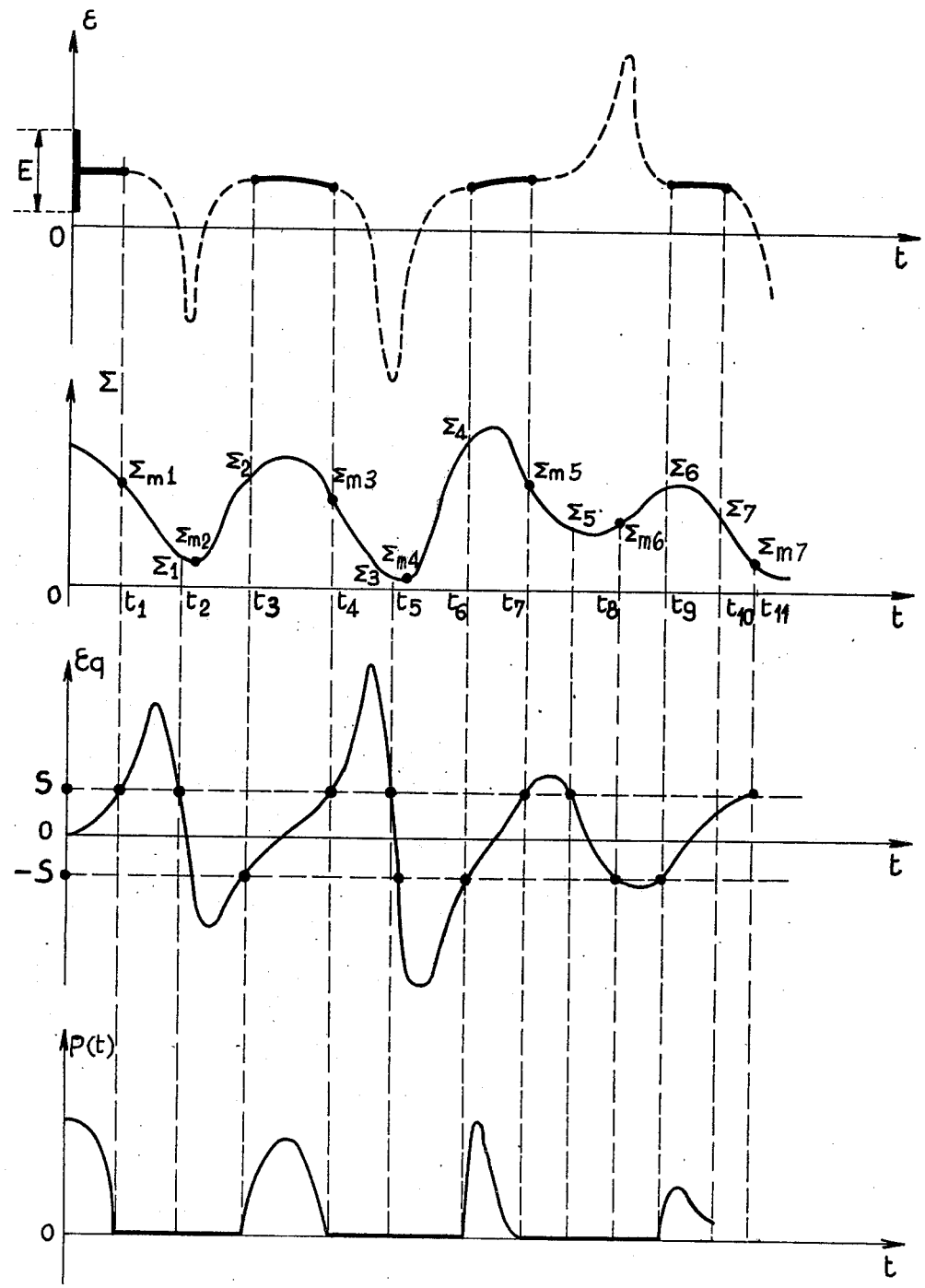
FIG. 3 is a set of graphs illustrating the correlation between signals $\Sigma$ and $\epsilon q$ and its relevancy to the selection of instants with measurement of angular-deviation signal $\epsilon$ by calculating the function of the statistical weight P(t) of these measurements.

FIG. 3 illustrates the signals $\Sigma$, $\epsilon$, $\epsilon q$ and P as functions of time for a given target having a certain angular span, assuming the antenna to be slightly off-boresight relative to the target. Thus, the correct measurements of the angular deviation $\epsilon$ must be between the limits of a zone of width E representative of the span of the target. The selected weighting function P shown in the bottom graph of FIG. 3 is given by the equation $$P = C(S - |\epsilon q|) \cdot \Sigma^n \quad (3)$$

which is valid for $|\epsilon q| < S$ (P=0 if $|\epsilon q| > S$); in equation (3), S is a predetermined constant threshold value for the function $\epsilon q$, n is a positive number which in the case of FIG. 3 is taken by way of example as unity, and C is a coefficient of value 0 or 1 which is determined by comparing the last value $\Sigma_{mi}$ or $\Sigma$, obtained when $|\epsilon q|$ exceeds the threshold S, with a value $\Sigma_k$ of $\Sigma$ existing when $|\epsilon q|$ again drops below S, so that:

if $\Sigma_k < \Sigma_{mi} \therefore C = 0;$ if $\Sigma_k > \Sigma_{mi} \therefore C = 1$.

The need for employing this constant C is due to the fact that a valid measurement of the deviation $\epsilon$ requires the signal $\Sigma$ to be at a local maximum; with $\Sigma_k > \Sigma_{mi}$ this condition is certainly satisfied.

This function P(t) assigns a statistical weight different from 0 only for intervals of $\epsilon$ representing good measurements, as is clearly shown in FIG. 3. It can be seen that signal $\Sigma$ is around a local maximum and $|\epsilon q| < S$ for the following time intervals:

0 to $t_1$, $t_3$ to $t_4$, $t_6$ to $t_7$, $t_9$ to $t_{11}$, i.e. in accordance with the correlation criteria referred to hereinbefore; only these time intervals are likely to give good values of $\epsilon$. During the interval $t_9$ to $t_{11}$, the value of signal $\Sigma$ drops below value $\Sigma_{m6}$ stored as the last value before $|\epsilon q| > S$. In accordance with the foregoing definitions, the statistical weighting function P(t) controlling the amplification of angular-deviation signal, $\epsilon$ must be 0 in the interval $t_{10}$ to $t_{11}$ during which $\Sigma < \Sigma_{m6}$. With this restriction, in FIG. 3 the suppressed values of $\epsilon$ are shown in dotted lines and coincide with the periods when function P(t) goes to zero.

Our present invention uses this function P(t) for the gain control of a nonlinear filter 17 (FIG. 4) of the Kalman type.

Figure 4:
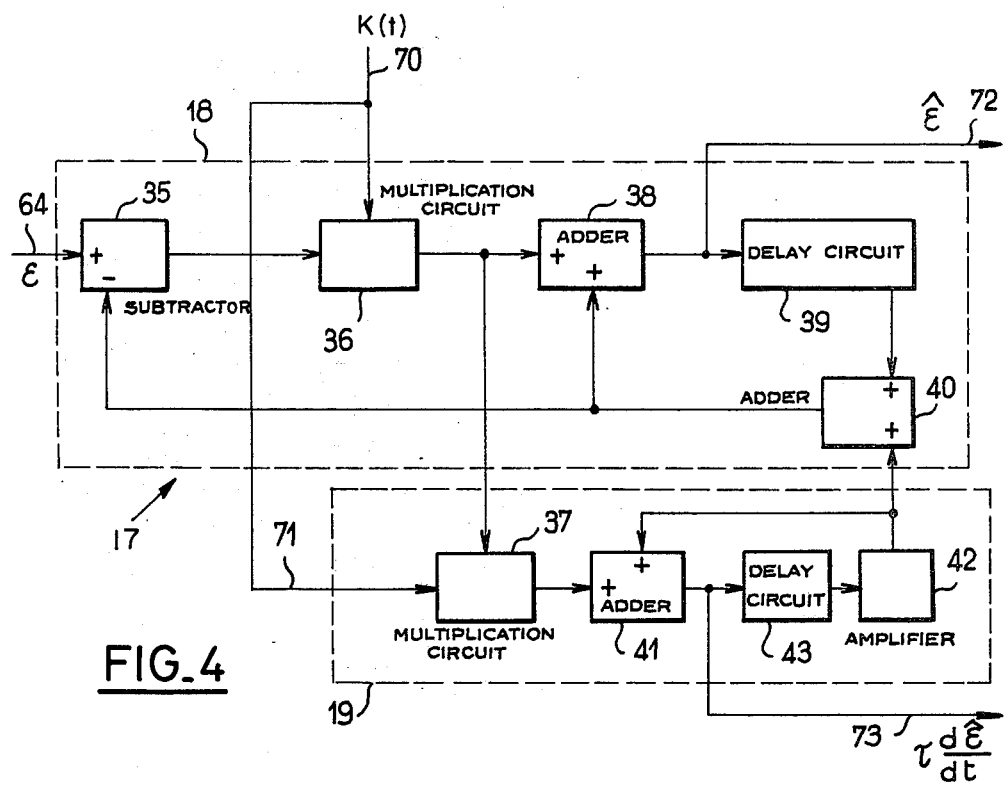
FIG. 4 is a block diagram of a nonlinear second-order dynamic filter embodying our invention.

The principle of such recursive filters has been dealt with in a number of publications and it will therefore suffice to describe only a single example of this type of filter having two stages 18 and 19 as shown in FIG. 4. The first stage 18 comprises a subtractor 35 receiving on the one hand the signal $\epsilon$ from terminal 64 and on the other hand the output of an adder 40 also connected to an input of another adder 38. The output of subtractor 35 is connected to a multiplication circuit 36, which also receives an external gain-control signal K from a terminal 70 and delivers its output signal to another input of adder 38 and to one input of a multiplication circuit 37 in the second stage 19 receiving on a second input 71 the gain-control signal K. The output of adder 38 is connected to a delay circuit 39 in a recursive loop and directly supplies at a terminal 72 the filtered angular-deviation measurement $\hat{\epsilon}$. The output of delay circuit 39 is connected to one input of adder 40 whose other input receives the output of an amplifier 42 included in stage 19, the output of that amplifier being also connected to one input of an adder 41 in stage 19. This adder 41 receives on another input the output of the multiplication circuit 37 and emits a signal representing the estimate of time differential $\tau(d\hat{\epsilon}/dt)$, $\tau$ being the delay of circuits 39 and 43. The latter signal is available at a terminal 73 and is also fed to the input of a delay circuit 43 in a loop of stage 19 whose output is connected to the input of amplifier 42.

If $\epsilon_t$ is the unfiltered angular-deviation measurement at an instant t, the filtered measurement $\hat{\epsilon}_t$ appearing on terminal 72 is given by the equation:

$$\hat{\epsilon}_t = (\epsilon_t - A_t) \cdot K + A_t \quad (4)$$

where $A_t$ represents a value derived from the estimated value $\hat{\epsilon}_{t-\tau}$ obtained at a preceding instant $(t-\tau)$ to which is added a precalculated estimate of the time differential supplied by the second-stage amplifier 42. Thus, the following relationship exists:

$$A_t = \hat{\epsilon}_{t-\tau} + \frac{\tau d\hat{\epsilon}_{t-\tau}}{dt} \quad (5)$$

It should be noted that these formulas apply only if signal K is also fed to the gain-control terminal 71, thus creating a gain $K^2$ for the second stage. If this is not the case, the stability of the filter is affected and filter divergence can occur. This point is important for the realization of the present invention.

Figure 5:
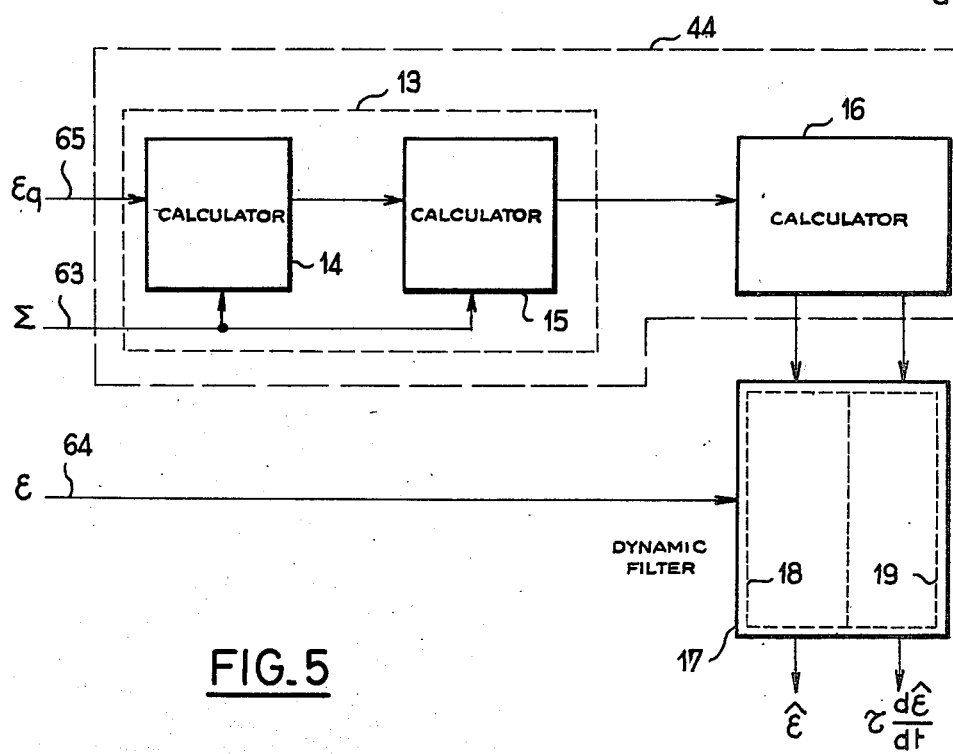
FIG. 5 is a block diagram of circuits for calculating the function P(t) and generating a gain-control signal K(t) applied to the nonlinear filter of FIG. 4.

An important feature of our invention, therefore, resides in the use of the observed correlation between the signals $\Sigma$ and $\epsilon q$ in the processing of the weighting function P(t) as described above and in the utilization of that function as the sole gain-controlling parameter for the two stages of nonlinear dynamic filter 17. This is shown in FIG. 5 where an arithmetic unit 44 comprises a processor 13 for the function P(t) which includes a calculator 14 receiving the signals $\epsilon$ and $\epsilon q$ and supplying a signal $\Sigma^n(S - |\epsilon q|)$, this signal being applied together with the signal $\Sigma$ to a calculator 15 which in turn supplies the weighting signal $P(t) = \Sigma^n(S - |\epsilon q|) \cdot C$ according to equation (3). Circuit 14 also comprises means for generating predetermined values n and S while circuit 15 automatically selects the value 0 or 1 for the coefficient C.

A circuit 16 receiving the output of circuit 15 calculates from the function P(t) the gain-control parameter K(t), which is simultaneously applied to the two stages 18, 19 of the nonlinear dynamic filter 17. As described with reference to FIG. 4, filter 17 receives the signal $\epsilon$ from input terminal 64 and emits the filtered signal $\hat{\epsilon}$ together with the estimate of the differential $\tau(d\epsilon/dt)$. Experimental studies and theoretical calculations have shown that, in order to yield good filtering results and to prevent a divergence of the filter, the function K(t) must always be below 1 and the gain of the second stage 19 must always be equal to $K(t)^m$ with an optimum operation for m=2. If the filter has more than two stages, the gain $K_i(t)$ of the $i^{th}$ stage of the filter must be greater than the gain $K_{i+1}$ of the $(i+1)^{th}$ stage of the filter. In the example given in FIG. 4, if the gain of stage 18 is K(t), then that of the second stage 19 is $K(t)^2$, which corresponds to optimum operation.

Figure 6:
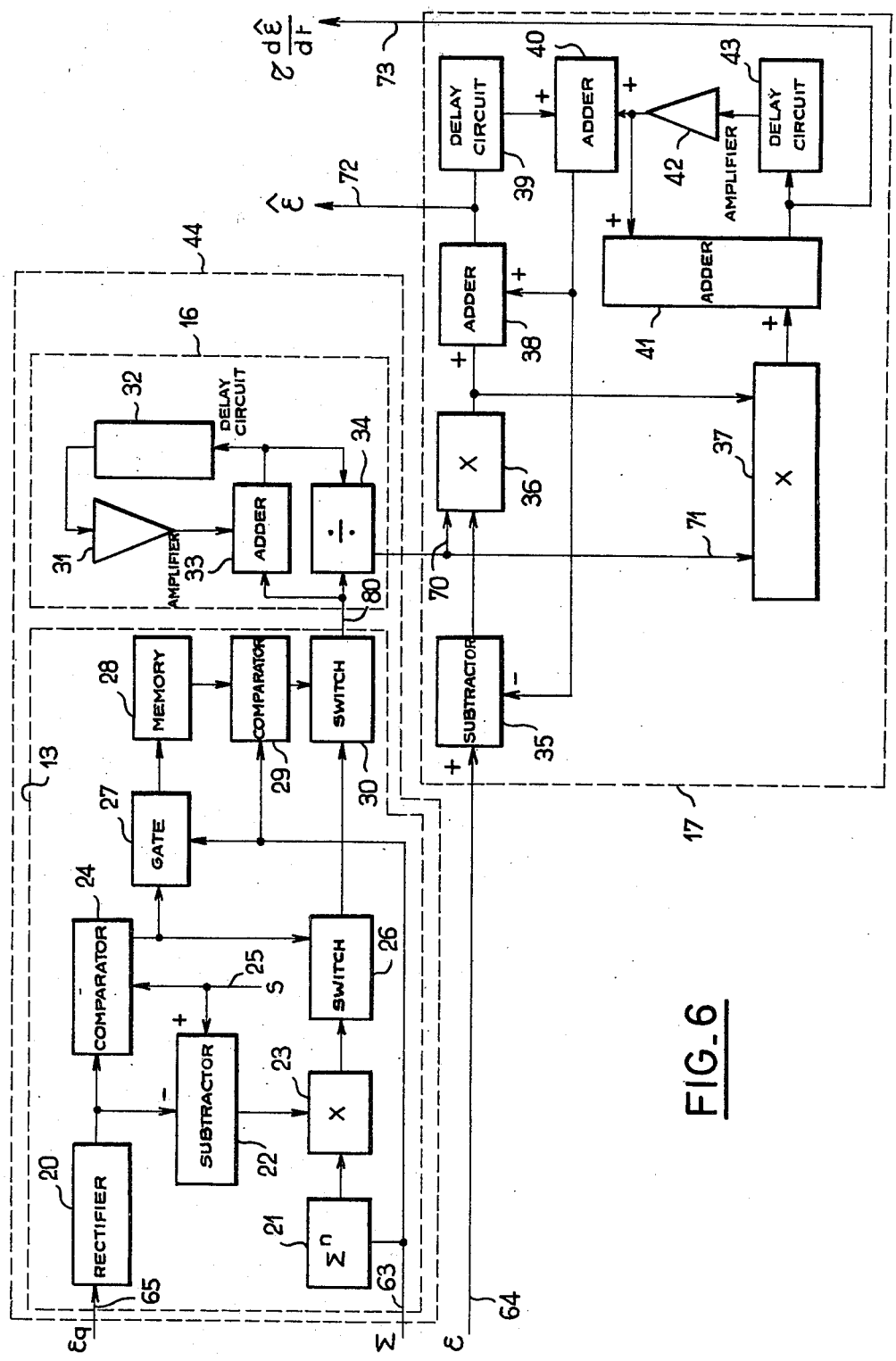
FIG. 6 is a more detailed block diagram of the circuitry shown in FIG. 5.

Details of the block diagram of FIG. 5 are given in FIG. 6. The circuit 13 calculating the function P(t) comprises a rectifier 20 which receives at its input the signal $\epsilon q$ from terminal 65 and supplies at its input the signal $|\epsilon q|$ to a comparator 24 and to a subtractor 22. Components 22 and 24 also receive the predetermined value S. A circuit 21 receives the signal $\Sigma$ from input 63 and converts it into signal $\Sigma^n$; the exponent n preset in this circuit may be selected for example as equal to 1 or 2. The output of circuit 21 is connected to a multiplier 23, which also receives the output of subtractor 22. The output of multiplier 23 is connected to a dividend input 80 of a divider 34 via two series switches 26 and 30. The output of comparator 24 controls the switch 26 and a gate 27 receiving the signal $\Sigma$, the output of gate 27 being connected to the input of a memory 28. Signal $\Sigma$ and the output signal of memory 28 are applied to the inputs of a comparator 29 whose output controls the switch 30. The gain-control calculator 16 comprises an adder 33 with a first input connected to the dividend input 80 of divider 34 and with its output connected on the one hand to a divisor input of divider 34 and on the other hand to a delay circuit 32. The latter is connected to a second input of adder 33 via an amplifier 31 having a gain of less than unity. The divider 34 delivers the gain-control signal K to the terminals 70 and 71 of the nonlinear dynamic filter 17 which, as described hereinbefore, receives at its input 64 the signal $\epsilon$ and supplies at its output 72 the filtered signal $\epsilon$ and at its output 73 the estimate of its differential $\tau(d\epsilon/dt)$.

The operating principle of circuit 13 is as follows. Rectifier 20 supplies signal $|\epsilon q|$, subtractor 22 determines the difference $S - |\epsilon q|$, circuit 21 calculates the power $\Sigma^n$ and multiplier 23 supplies the function $\Sigma^n(S - |\epsilon q|)$. Comparator 24, on finding that $|\epsilon q| > S$, commands the opening of switch 26, thereby establishing a zero signal at terminal 80, as well as the opening of gate 27 permitting the storage of the value $\Sigma_{mi}$ reached by signal $\Sigma$ at the time when $|\epsilon q|$ has exceeded S. On the other hand, if $|\epsilon q| < S$, gate 27 remains closed and signal $\Sigma$ is constantly compared with the value $\Sigma_{mi}$ stored in memory 28 during the last passage of $|\epsilon q|$ above the threshold S. If the value of the stored signal $\Sigma_{mi}$ exceeds the current value $\Sigma_k$ of function $\Sigma$, a signal is supplied by comparator 29 which brings about the opening of switch 30 and consequently the zeroizing of the signal at terminal 80. Thus, the weighting function P(t) conforming to equation (3) is available at the input terminal 80 of calculator 16 which constitutes a recursive integrating filter of fixed gain $G_1 < 1$ having a time constant $$\tau_1 = \frac{\tau_o G_1}{1 - G_1} \quad (6)$$

where $\tau_o$ is the delay of circuit 32. Time constant $\tau_1$ determines the average pass band of the nonlinear dynamic filter 17, this pass band being a function of the width of the spectrum of the valid measurements.

The function K(t) is obtained by forming the quotient of the input and output signals of filter 16. During periods of poor measurement, P(t)=0, K(t)=0 and filter 17 operates on stored values. During periods of good measurement, P(t)>0 and function K(t) is dependent on the magnitude of P(t) and of prior measurements taken within the time limits imposed by the time constant $\tau_1$ of filter 16. Thus, for example, if during a time exceeding $3\tau_1$ no measurement has been retained on account of P(t)=0, the arrival of a period of good measurement causes the function K(t) to assume a value close to 1. If this good measurement follows other good-measurement periods with P(t)>0, the function K(t) assumes an intermediate value $0 < K < 1$ which depends on the results of the prior measurements between times t and $t - 3\tau_1$.

Experimental measurements have shown that the function P(t) must be canceled out between 30 and 50% of the time to obtain a good compromise between the necessity of rapidly compensating the delay accumulated at the start of filter loading and the need for limiting the overswing amplitude.

Figure 7:
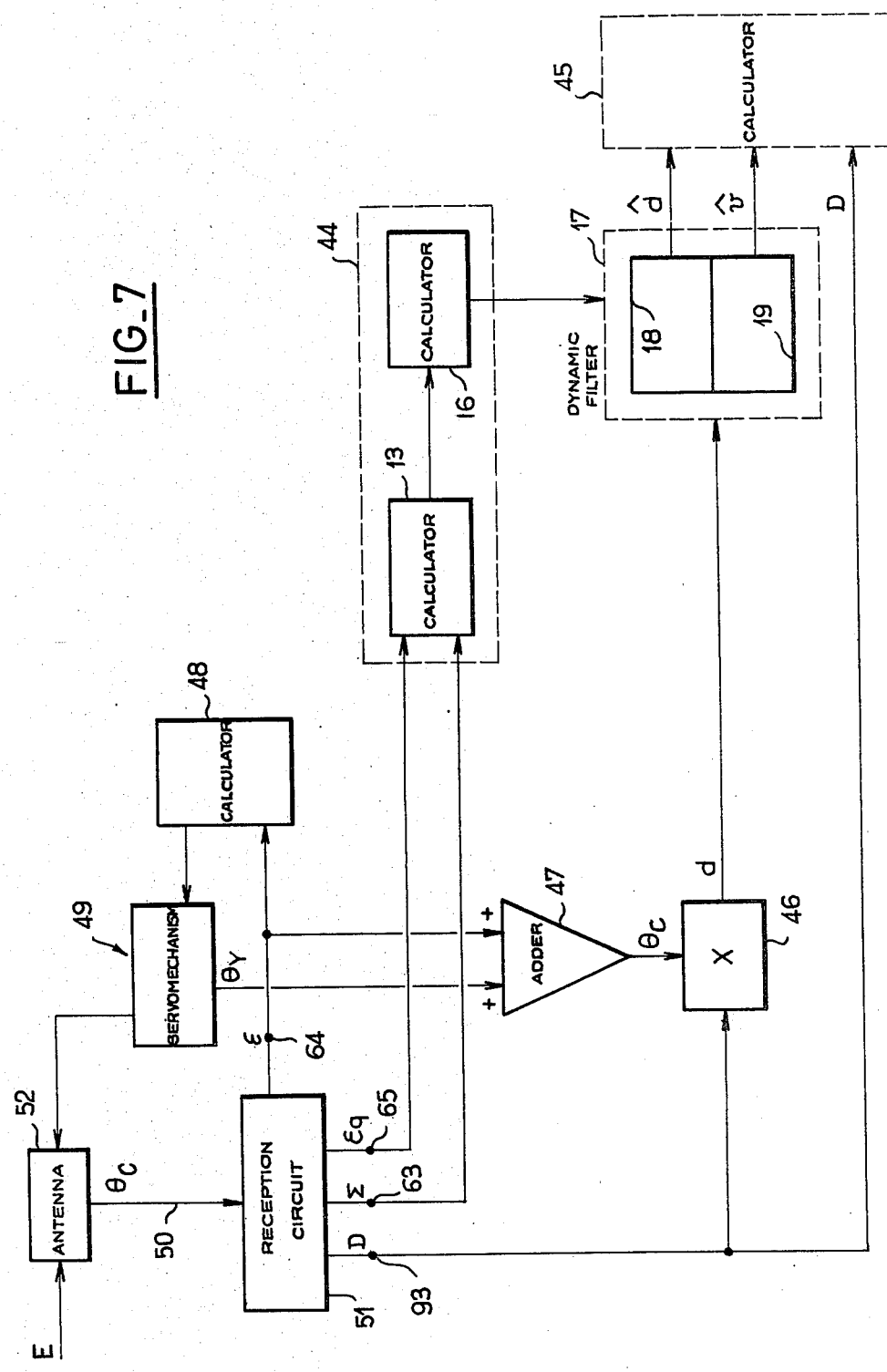
FIG. 7 is an overall block diagram of a tracking radar embodying our present invention.

A radar system embodying our invention, shown in FIG. 7, comprises equipment used in the automatic tracking of moving targets.

A reception circuit 51 receives signals from an antenna 52 and emits on four output channels, i.e. at terminals 63, 64, 65 and 93, respective signals $\Sigma$, $\epsilon$, $\epsilon q$ and D. An antenna-orientation calculator 48, implementing a transfer function $$H(P) = 1 + \frac{1}{P(\tau_a)}$$

where $\tau_a$ is a predetermined time constant of this circuit, receives at its input the deviation signal $\epsilon$ from terminal 64 and is connected by its output to a servomechanism 49 controlling the orientation of antenna 52. The deviation signal $\epsilon$ from terminal 64 and the measurement of the orientation angle from circuit 49 are applied to an adder 47. This adder works into one input of a multiplier 46 receiving at its other input the target-distance measurement D from the terminal 93 which is also connected to a computing unit or calculator 45. The output of multiplier 46 is connected to the nonlinear dynamic second-order filter 17. Unit 44 operates in the manner described with reference to FIG. 5, its circuit 13 calculating the function P(t) and receiving the signals $\epsilon q$ and $\Sigma$ from terminals 65 and 63 while its circuit 16 calculates K(t) from P(t) as described in conjunction with FIG. 6. The output of circuit 16 supplies the gain-control signal K(t) to each of the two stages 18 and 19 of the nonlinear dynamic filter 17, each of the said stages having its output connected to the computing unit 45. The operation of the system of FIG. 7 is as follows. In response to the deviation-measurement signal $\epsilon$ at terminal 64, supplied by the radar receiver 51, the antenna servomechanism 49 suppresses the aiming error under the control of circuit 48 which transforms the function $\epsilon$ into $$\epsilon + \frac{\epsilon}{P(\tau_a)}$$

whereby the antenna-orientation angle $\theta_r$ is modified. The values of $\theta_r$ and $\epsilon$ are added in circuit 47 so as to yield a value $\theta_c = \theta_r + \epsilon$, $\theta_c$ being the orientation angle of the target with respect to an arbitrary fixed marker. This angular value $\theta_c$ is multiplied in circuit 46 by the measurement of the distance D at which the target is located, available at terminal 93, thus giving the transverse deviation d of the moving target. This signal d is filtered by the nonlinear dynamic filter 17, controlled by the gain-calculation unit 44 which obtains the signals $\Sigma$ and $\epsilon q$ from receiver 51. Its first stage 18 then emits the filtered measurement of the transverse deviations $\hat{d}$ while its second stage 19 emits the estimate $\hat{v}$ of the transverse target velocity, this information being transmitted to the computer unit 45 which can thus calculate the true position of the target by effecting a dynamic error correction on the basis of signal $\hat{v}$.

The advantage of such a device is that the transverse deviation $\hat{d}$ is made available with a higher degree of accuracy, due to the fact that the filtering quality and the estimate of the velocity v make it possible to compensate any inherent delay of the system.

Figure 8:
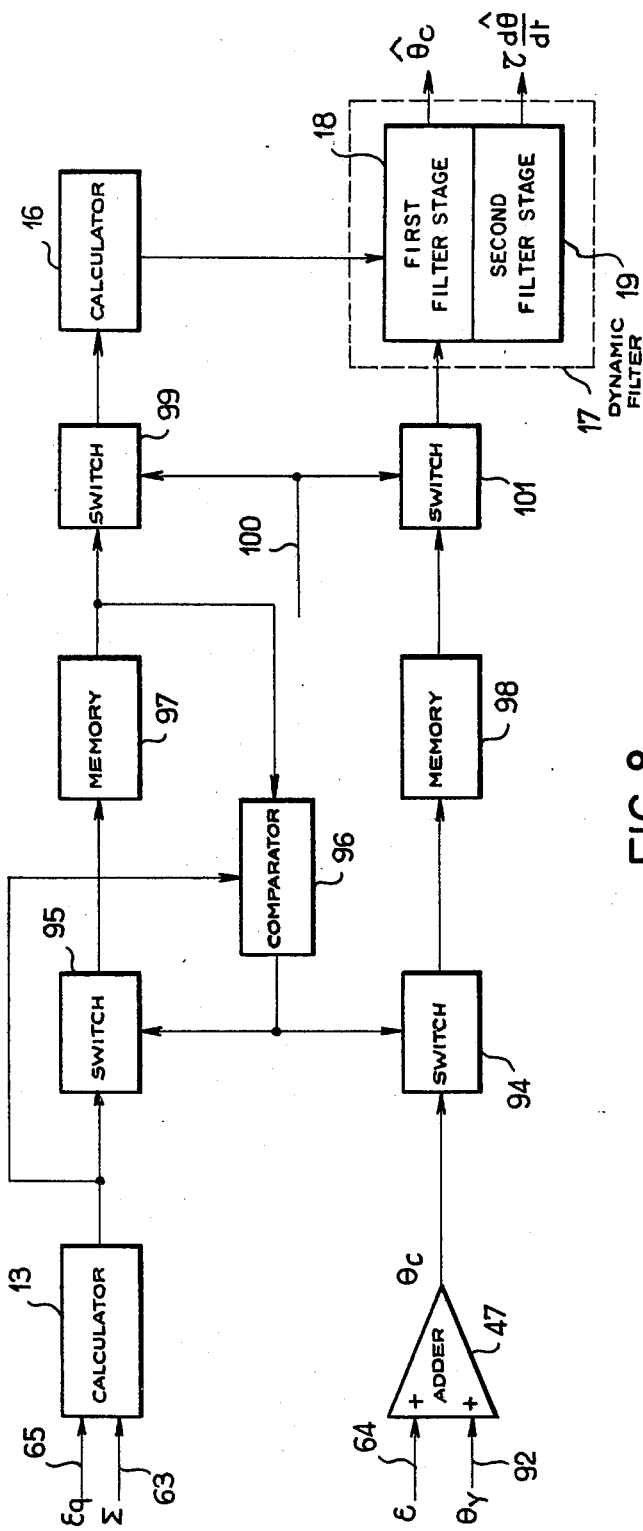
FIG. 8 is an overall block diagram of a multifrequency radar embodying our present invention.

Part of a multifrequency radar embodying our invention is illustrated in FIG. 8. Several elements are the same as in FIG. 7, namely the circuit 13 supplying the signal P(t) and receiving at its two inputs the signal $\epsilon q$ from terminal 65 and the signal $\Sigma$ from terminal 63, the adder 47 receiving at its two inputs the signal $\epsilon$ from terminal 64 and the antenna-pointing angle $\theta_r$ from a terminal 92 while supplying at its output the target angle $\theta_c$ with respect to the fixed marker, and the circuit 16 supplying signal K(t) to filter 17. This device further has four switches 94, 95, 99 and 101, a comparator 96 and two memories 97 and 98. The input of switch 95 is connected to the output of circuit 13 and to a first input of comparator 96. The output of this switch is connected to memory 97 whose output is connected to the input of switch 99 and to the second input of comparator 96. The output signal of this comparator controls the two switches 94 and 95. The output of switch 94 is connected to the input of memory 98 whose output is connected to the input of switch 101. The output of switch 99 is connected to circuit 16 whereas the output of switch 101 is connected to the input of the nonlinear filter 17. The operation of this embodiment of our invention is as follows. For each frequency, the value of P(t) calculated by circuit 13 is compared with that obtained for the preceding frequency stored in memory 97. If the new value of P(t) exceeds the old value, comparator 96 supplies a signal which closes the switches 94 and 95, thus permitting the replacement in memory 97 of the old value of P(t) by its new value and in memory 98 of the old value of $\theta_c$ by the new value. At the end of each frequency cycle, a signal is supplied by an electromagnetic detection circuit in receiver 51 to a control input 100 of switches 99 and 101 for closing same, thus permitting the transfer of the best value of P(t) to circuit 16 supplying the signal K(t) and the best value of $\theta_c$ to the nonlinear filter 17. It is pointed out that all the circuits described hereinbefore can be either digital or analog. In the digital case, the sampling circuit is followed by analog/digital converters located at respective outputs of receiver 51 (FIG. 7).

We claim:

1. A circuit arrangement for improving the accuracy of angular measurements in an echo-type target-locating system with a first reception channel emitting a sum signal $\Sigma$, a second reception channel emitting a difference signal $\Delta$, and circuitry connected to said reception channels for deriving therefrom an angular-deviation signal $\epsilon$ and a quadrature deviation signal $\epsilon q$ respectively appearing on a first and a second output thereof, comprising:

first calculating means connected to said first reception channel and to said second output for generating a weighting function P(t) under the control of said sum signal $\Sigma$ and said quadrature deviation signal $\epsilon q$, said weighting function P(t) going to zero during periods in which the sum signal $\Sigma$ is low and the quadrature deviation signal $\epsilon q$ is peaking;

second calculating means in cascade with said first calculating means for establishing a gain-control signal K(t) varying with said weighting function P(t); and dynamic filter means connected to said second calculating means and to said first output for processing said angular-deviation signal $\epsilon$ by multiplying same with said gain-control signal K(t) and subjecting the product to recursive filtering.

2. A circuit arrangement as defined in claim 1 wherein said dynamic filter means comprises two cross-connected stages with respective recursive loops each introducing a delay $\tau$, one of said stages emitting a corrected deviation signal, the other of said stages emitting an estimated time derivative of said corrected deviation signal multiplied by said delay $\tau$.

3. A circuit arrangement as defined in claim 2 wherein the loops of said stages each include a respective multiplier with an input connected to said second calculating means for receiving said gain-control signal K(t) therefrom.

4. A circuit arrangement as defined in claim 3 wherein the multiplier of said other of said stages has another input connected to an output of the multiplier of said one of said stages whereby the signal processed in said other of said stages is multiplied with the square of said gain-control signal K(t).

5. A circuit arrangement as defined in claim 2, further comprising an adder inserted between said first output and said dynamic filter means, said adder having one input receiving said angular-deviation signal $\epsilon$ and another input connected to a position controller for a radar antenna for receiving therefrom an angular-orientation signal $\theta_r$ to be additively combined with the angular-deviation signal $\epsilon$ into an angular value $\theta_c$ delivered to said dynamic filter means for processing.

6. A circuit arrangement as defined in claim 5, further comprising multiplying means inserted between said adder and said dynamic filter means, said multiplying means having an input connected to a further output of said circuitry for receiving therefrom a target-distance measurement D and delivering the product $D \cdot \theta_c$ to said dynamic filter means whereby said other of said stages emits a target-velocity estimate v.

7. A circuit arrangement as defined in claim 1, 2, 3 or 4 wherein said first calculating means comprises a rectifier connected to said second output for generating an absolute value $|\epsilon q|$ of said quadrature deviation signal $\epsilon q$, a subtractor connected to said rectifier and to a source of a predetermined threshold S for producing the difference $S - |\epsilon q|$, arithmetic means connected to said first reception channel and to said subtractor for producing said weighting function P(t) proportional to the product $\Sigma^n \cdot (S - |\epsilon q|)$ where n is an exponent equal to at least 1, said arithmetic means having an output connection to said second calculating means, said switch means in said output connection controlled by a comparator in parallel with said subtractor for blocking the transmission of said product to said second calculating means whenever said absolute value $|\epsilon q|$ exceeds said threshold S.

8. A circuit arrangement as defined in claim 7 wherein said first calculating means further comprises a memory connected to said first reception channel via a gate controlled by said comparator for storing said sum signal $\Sigma$ as long as said absolute value $|\epsilon q|$ exceeds threshold S, and comparison means with inputs connected to said memory and to said first reception channel and with an output connected to said switch means for blocking said output connection independently of said comparator whenever the current value of said sum signal $\Sigma$ is less than the value last stored in said memory.

9. A circuit arrangement as defined in claim 1, 2, 3 or 4 wherein said second calculating means comprises a recursive loop including an adding circuit, a delay circuit and an amplifier in cascade, said adding circuit having an input connected to said first calculating means and another input connected to an output of said amplifier, and a divider having a dividend input connected in parallel with said adding circuit to said first calculating means and a divisor input connected in parallel with said delay circuit to the output of said adding circuit, said divider having an output emitting said gain-control signal K(t) as the quotients of signals appearing at said dividend and divisor inputs thereof.

10. A circuit arrangement as defined in claim 9 wherein said amplifier has a gain of less than unity.

* * * * *